United States Patent [19]

Riegler et al.

[11] 3,934,955
[45] Jan. 27, 1976

[54] FIXED BEARING ASSEMBLY FOR A TILTABLE-CONVERTER CARRYING TRUNNION

[75] Inventors: Ernst Riegler, Enns; Manfred Schmidt, Linz, both of Austria

[73] Assignee: Vereinigte Österreichische Eisen- und Stahlwerke-Alpine Montan Aktiengesellschaft, Linz, Austria

[22] Filed: Jan. 2, 1975

[21] Appl. No.: 538,202

[30] Foreign Application Priority Data

Jan. 10, 1974 Austria .................................. 167/74

[52] U.S. Cl. ................... 308/72; 266/36 P; 308/176
[51] Int. Cl.² ......................................... F16C 23/06
[58] Field of Search ...................... 308/6 R, 72, 176; 266/35 R, 36 P, 36 H

[56] References Cited
UNITED STATES PATENTS

| | | |
|---|---|---|
| 2,976,090 | 3/1961 | McFeaters ...................... 308/6 R X |
| 3,291,541 | 12/1966 | Dellinger ................................. 308/6 R |
| 3,459,068 | 8/1969 | Mahringer et al. ............. 266/36 P X |

*Primary Examiner*—M. Henson Wood, Jr.
*Assistant Examiner*—Gene A. Church
*Attorney, Agent, or Firm*—Brumbaugh, Graves, Donohue & Raymond

[57] ABSTRACT

A fixed bearing assembly for a tiltable-converter carrying trunnion comprises a bearing accommodating its angular and wobbling movements, respectively, arranged in a housing, in which assembly the carrying trunnion is united with the spur gear wheel in a common bearing and drive housing.

15 Claims, 7 Drawing Figures

FIXED BEARING ASSEMBLY FOR A TILTABLE-CONVERTER CARRYING TRUNNION

BACKGROUND OF THE INVENTION

This invention relates to a fixed bearing assembly for a tiltable-converter carrying trunnion with a bearing secured to the carrying trunnion and accommodating its angular (sagging) and wobbling movements, respectively, and arranged in a housing, for instance a slide, articulation, or ball and roller bearing.

In the fields of general engineering and gear making, respectively, it is customary to mount a shaft in a fixed bearing on one side and in an expansion bearing on the other side, in order to accommodate thermal expansion and assembly deficiencies, respectively, and to guarantee smooth operation.

Also in the converter plant, the converter carrying ring is usually mounted in a fixed bearing with one carrying trunnion and in an expansion bearing with the other carrying trunnion. However, this kind of mounting requires rather a lot of space which is not always available, especially in cases where already existent converter plants have to be reconstructed for a larger capacity and housed in already existent hall constructions. Furthermore, in known fixed bearing constructions, in addition to a bearing inset and a bearing housing, a separate gear unit is necessary, consisting of a drive housing, a spur gear wheel, an intermediate gear and a torque support, which require additional space and are heavily built and therefore need a large, strong base.

SUMMARY OF THE INVENTION

It is the object of the present invention to avoid these disadvantages and difficulties and to create a space-saving fixed bearing in compact form which is especially useful for the reconstruction of converter plants in already existent hall constructions.

According to the invention, this object is achieved in a fixed bearing assembly for the carrying trunnion of a tiltable converter with a bearing secured to the carrying trunnion accommodating its angular and wobbling movements, respectively, for instance a slide, articulation, or ball and roller bearing, arranged in a housing, by uniting the carrying trunnion with the spur gear wheel and arranging them in a common bearing- and drive housing that is directly secured to the base.

According to one embodiment of the invention the spur gear wheel consists of a spherical-zone-shaped hub arranged on the carrying trunnion and of a converter toothed wheel meshing with the hub, and is mounted in spherical-running-faces-containing bearings, each bearing having an inner ring and an outer ring, wherein all spherical faces have the same center.

The hub may have an arc-shaped external toothing and the converter toothed wheel a straight internal toothing, the external toothing of the hub being displaceable relative to the internal toothing of the converter toothed wheel.

It is, however, also possible for the hub and the converter toothed wheel to mesh by means of crowned-ground rollers inserted in corresponding recesses of semi-circular cross-section.

According to a further feature of the invention the converter toothed wheel is adjustable relative to the housing by means of rollers, preferably by means of three rollers arranged around the periphery of the housing, the converter toothed wheel preferably being herringbone-toothed and the adjusting rollers running in the free space or recess between the teeth inclined to the left and the teeth inclined to the right, so that the converter toothed wheel is free from load.

In a modified embodiment of the invention the converter toothed wheel forms a one-piece unit with the hub, and the toothed wheel has an external toothing arcuately extending around the center of the bearing.

BRIEF DESCRIPTION OF THE DRAWINGS

These and other features of the invention will now be described in greater detail with reference to the accompanying drawings in which.

DESCRIPTION OF EXEMPLARY EMBODIMENTS

Figure 3:
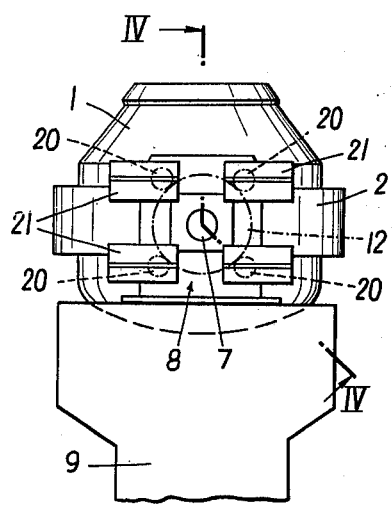
FIG. 1 shows a general view of a converter plant and FIGS. 2 and 3 show the corresponding plan and side views, respectively.
Figure 1:
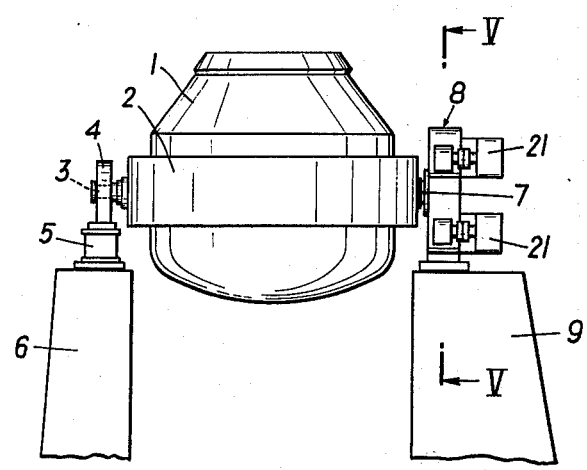
Figure 2:
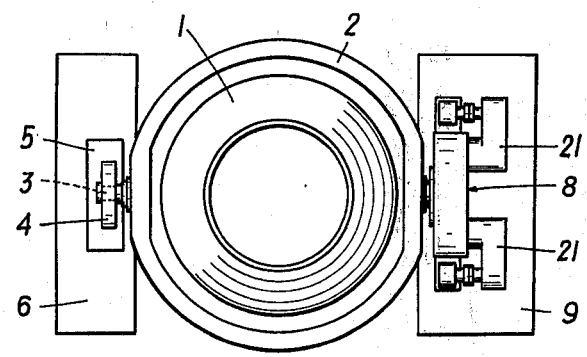
Figure 4:
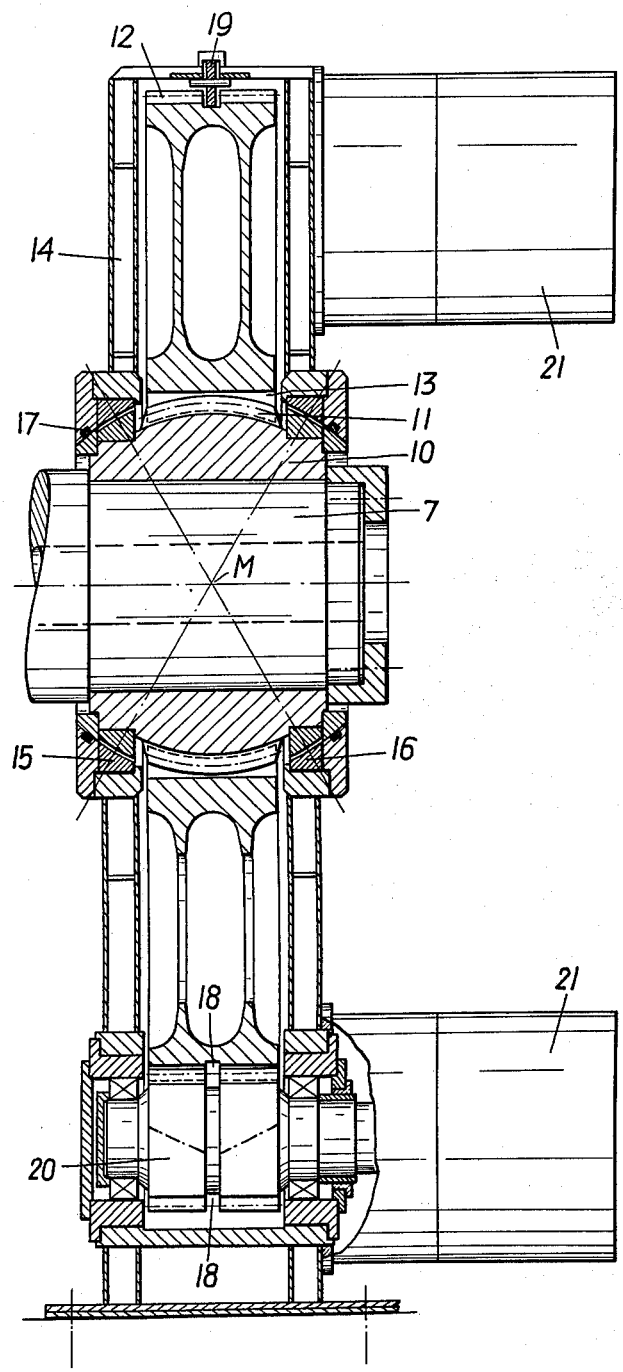
FIG. 4 is a section along line IV—IV of FIG. 3.

In FIG. 1 the converter is denoted with 1, the carrying ring with 2, the expansion bearing trunnion with 3, the expansion bearing with 4, the expansion bearing stand with 5 and the base on the side of the expansion bearing with 6. The fixed bearing which according to the invention is united with the drive is generally denoted with 8 and secured to the base 9. As can be seen in FIG. 4, a spherical-zone-shaped hub 10 is provided on the fixed bearing trunnion 7, by a shrink-fit, e.g., which hub has an arc-shaped external toothing 11 following the spherical face. This toothing is in engagement with the converter toothed wheel 12 which has a straight internal toothing 13. The spur gear wheel thus formed by the hub 10 and the converter toothed wheel 12 is enclosed in the housing 14 and mounted in bearings 15 and 16, each consisting of an inner ring and an outer ring. These bearings have spherical running faces 17 whose center M coincides with the center of the spherical hub face 10. Thus a displacement of the trunnion during deformations and saggings, respectively, relative to the fixed housing 14 is possible. The converter toothed wheel has an external herringbone-toothing, and between the teeth inclined to the left and the teeth inclined to the right there is a free space or recess 18. At the bottom of the recess 18 rollers 19 roll which are arranged in three different places on the periphery of the housing 14. The width of these rollers corresponds to the width of the free space 18, so that the drive pinions 20 can float into the toothed wheel 12. Instead of the internal toothing of the converter toothed wheel and the external toothing of the hub, one could also use crowned-ground rollers for transmitting the torque, which are inserted into corresponding recesses of semicircular cross-section in the hub on the one hand, and in the inner circle of the converter toothed wheel, on the other hand. In a trunnion displacement the carrying trunnions pivot around the center M. The hub 10 follows the displacement, while the toothed wheel 12 remains in its position. When according to the invention the fixed bearing is united with the drive in a common housing which is connected to the base, the driving forces can be transmitted without torque support. The intermediate gears 21 (FIGS. 2 and 3) suitably are directly flanged to the housing 14. This results in an especially compact construction.

Figure 5:
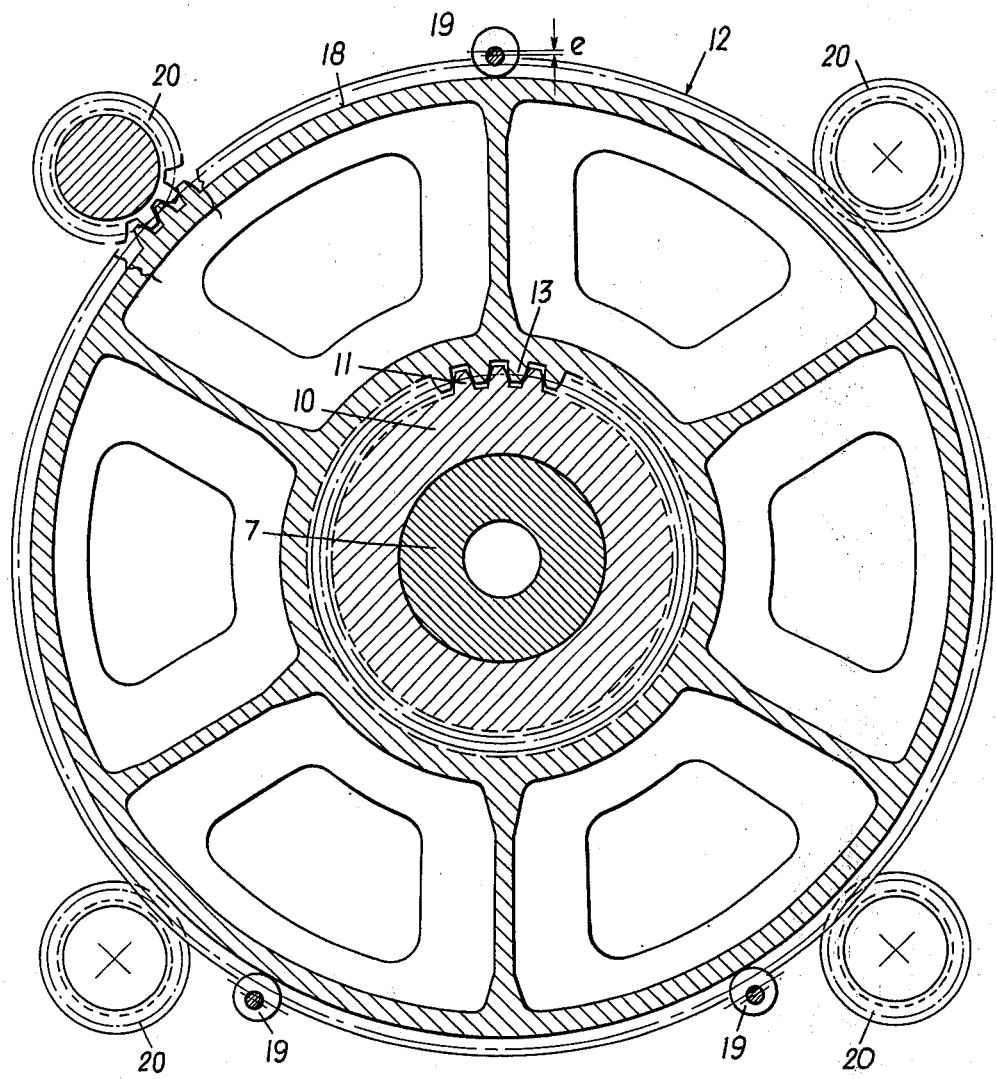
FIG. 5 is a section along line V—V of FIG. 1.

FIG. 5 shows the distribution of the rollers 19 and the drive pinions 20 and also the internal and external toothings. Between the external toothing 11 of the hub 10 and the internal toothing 13 of the converter toothed wheel 12 there is a little play, so that with the help of the adjustable eccentricity of the rollers 19 the load of the toothed wheel is accommodated by the lower rollers 19 and the toothings 11 and 13 are freed from load. Thus, the toothings are only used for transmitting the torques and their mutual movability during a displacement is maintained.

Figure 6:
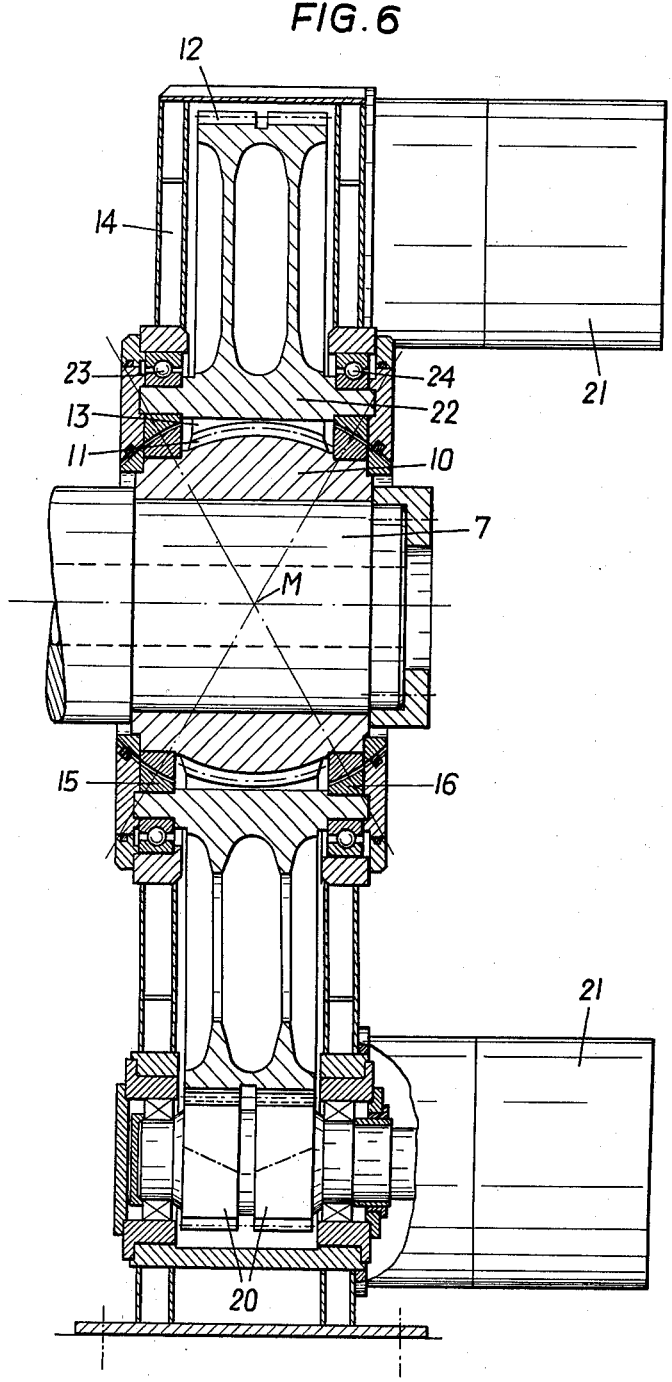
FIG. 6 shows a modified embodiment of the object of the invention in a section analogous to FIG. 4, i.e. along line IV—IV of FIG. 3.

In the embodiment of FIG. 6 instead of the guiding rollers 19 separate housing bearings 23 and 24 are provided on hub 22 of the toothed wheel 12, the bearing 23 of which serves as fixed bearing and the bearing 24 as expansion bearing. The bearings can be slide-, articulation-, or ball and roller bearings. The displacement occurs in the same way as in the embodiment described in FIGS. 4 and 5.

Figure 7:
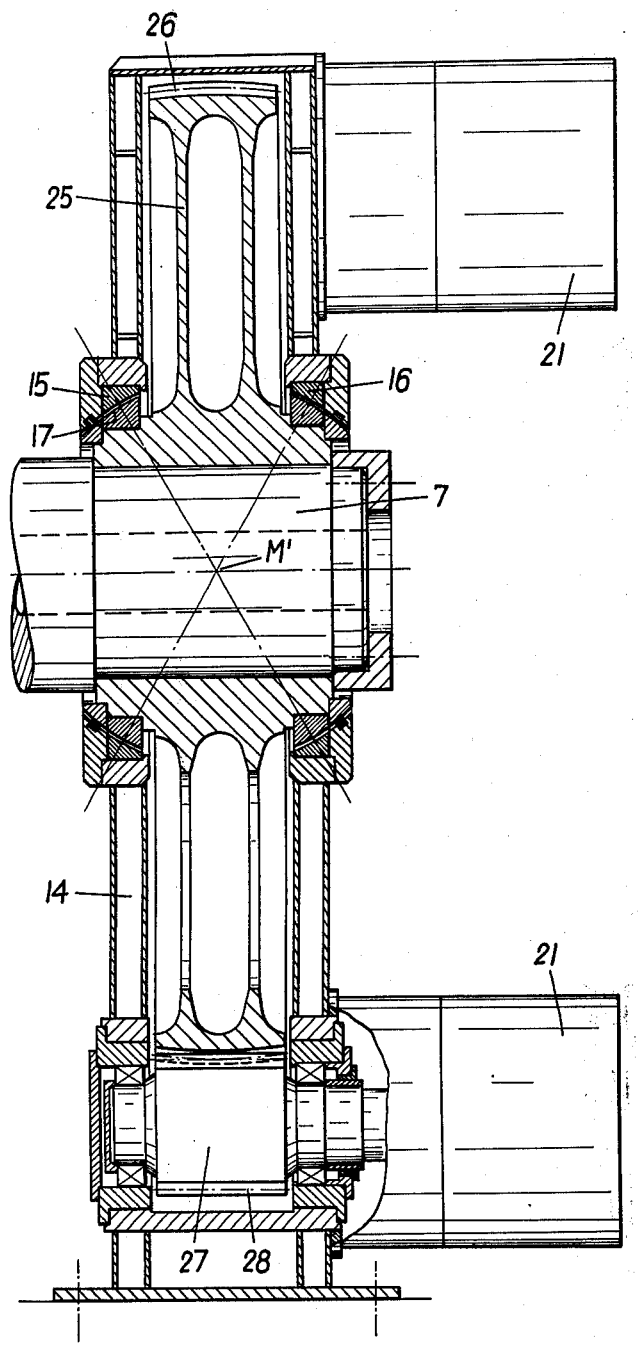
FIG. 7 shows another modified embodiment similarly shown.

In the modified embodiment of the invention of FIG. 7 a one-piece converter toothed wheel 25 is directly placed on the bearing trunnion 7, i.e. without a spherical-zone-shaped hub therebetween, and is enclosed in the housing 14 and mounted in the bearings 15 and 16 in the same way as described in the previous embodiments. The toothed wheel 25 has an arcuate outer toothing 26, whose center coincides with the center of the bearing, i.e. with the center of the running faces 17. Other than in the embodiment of FIGS. 4 and 5, not a herringbone-toothing, but a straight toothing is provided. The pinion 27 has a straight toothing 28 and the displacement takes place by pivoting the toothed wheel 25 relative to the stationary housing 14 around the center M'.

What we claim is:

1. A fixed bearing assembly for a tiltable-converter carrying trunnion which comprises:
   a spur gear wheel secured to the carrying trunnion,
   a base,
   a common bearing and drive housing directly secured to the base and jointly accommodating the carrying trunnion and the spur gear wheel, and
   a bearing means between the spur gear wheel and the housing for accommodating angular and wobbling movements of the carrying turnnion spur gear wheel.

2. A fixed bearing assembly as set forth in claim 1, wherein the bearing accommodating the carrying trunnion is a slide bearing.

3. A fixed bearing assembly as set forth in claim 1, wherein the bearing accommodating the carrying trunnion is an articulation bearing.

4. A fixed bearing assembly as set forth in claim 1, wherein the bearing accommodating the carrying trunnion is a ball bearing.

5. A fixed bearing assembly as set forth in claim 1, wherein the bearing accommodating the carrying trunnion is a roller bearing.

6. A fixed bearing assembly as set forth in claim 1 wherein said bearing means for mounting the spur gear wheel are each in the form of an inner ring and an outer ring and have spherical running faces, wherein said spur gear wheel comprises a hub formed with a spherical zone and arranged on the carrying trunnion, and a converter toothed wheel meshing with the hub, the spherical running faces of the bearings and the spherical zone of the hub having a common center.

7. A fixed bearing assembly as set forth in claim 6, wherein the hub has an arc-shaped external toothing and the converter toothed wheel has a straight internal toothing, the external toothing of the hub being displaceable relative to the internal toothing of the converter toothed wheel.

8. A fixed bearing assembly as set forth in claim 6, wherein the hub and the converter toothed wheel have corresponding recesses of semi-circular cross-section and wherein crowned-ground rollers are inserted in the corresponding recesses for enabling meshing of the hub with the converter toothed wheel.

9. A fixed bearing assembly as set forth in claim 1, wherein the spur gear wheel comprises a hub and a converter toothed wheel meshing therewith and wherein rollers are provided for adjusting the converter toothed wheel relative to the common bearing and drive housing.

10. A fixed bearing assembly as set forth in claim 9, wherein said rollers comprise three rollers arranged around the periphery of the common bearing and drive housing for adjusting the converter toothed wheel relative to the housing.

11. A fixed bearing assembly as set forth in claim 9, wherein the converter toothed wheel has a herringbone-toothing with left-inclined and right-inclined teeth and a recess therebetween, the adjusting rollers running in said recess, freeing the converter toothed wheel from load.

12. A fixed bearing assembly as set forth in claim 9, wherein the converter toothed wheel is adjusted with a slight play relative to the hub.

13. A fixed bearing assembly as set forth in claim 6, wherein separate housing bearings are provided for mounting the converter toothed wheel.

14. A fixed bearing assembly as set forth in claim 1, wherein the spur gear wheel comprises as one integral unit a converter toothed wheel and a hub, the converter toothed wheel having an external toothing arcuately extending around the center of the bearing.

15. A fixed bearing assembly as set forth in claim 1, further comprising drives with intermediate gears and motors secured to the common bearing and drive housing.

* * * * *